United States Patent
Viljanen

[19]

[11] Patent Number: 5,844,516
[45] Date of Patent: *Dec. 1, 1998

[54] METHOD AND APPARATUS FOR WIRELESS REMOTE CONTROL

[75] Inventor: Teijo Viljanen, Kauniainen, Finland

[73] Assignee: Oy Helvar, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 554,451

[22] Filed: Nov. 7, 1995

Related U.S. Application Data

[63] Continuation-in-part of Ser. No. 345,595, Nov. 28, 1994, abandoned.

[30] Foreign Application Priority Data

Dec. 3, 1993 [FI] Finland ..................................... 935419

[51] Int. Cl.⁶ .................................................. G08C 19/12
[52] U.S. Cl. ........................... 341/173; 341/176; 310/36; 310/37; 340/825.72
[58] Field of Search .................................... 341/173, 176; 340/310.01, 310.02, 310.06, 825.72; 310/36, 37

[56] References Cited

U.S. PATENT DOCUMENTS

| | | | |
|---|---|---|---|
| 2,441,760 | 5/1948 | Giannini et al. | 341/173 |
| 3,614,760 | 10/1971 | Zimmet et al. | 340/539 |
| 3,626,406 | 12/1971 | Iritani | 340/347 |
| 3,970,939 | 7/1976 | Willis | 340/307 |
| 4,101,792 | 7/1978 | Shoupp et al. | 310/15 |
| 4,412,355 | 10/1983 | Terbrack et al. | 455/603 |
| 4,471,353 | 9/1984 | Cernik | 340/825 |
| 5,247,295 | 9/1993 | Kanda | 340/825.57 |

FOREIGN PATENT DOCUMENTS

| | | |
|---|---|---|
| 0 361 881 | 5/1990 | European Pat. Off. . |
| A-57174950 | 10/1982 | Japan . |
| A-01034173 | 5/1989 | Japan . |
| 1-91598 | 11/1989 | Japan . |

Primary Examiner—Jeffery A. Hofsass
Assistant Examiner—Ashok Mannava
Attorney, Agent, or Firm—Zarley,McKee,Thomte,Voorhees & Sease

[57] ABSTRACT

The invention relates to a method and apparatus for wireless remote control. A transmitter (1) with no batteries receives its operating power from a generator (3) which produces electrical energy inductively upon turning or pressing an operating element (4) manually. The same operating element can also be used for determining the direction and degree of control.

20 Claims, 4 Drawing Sheets

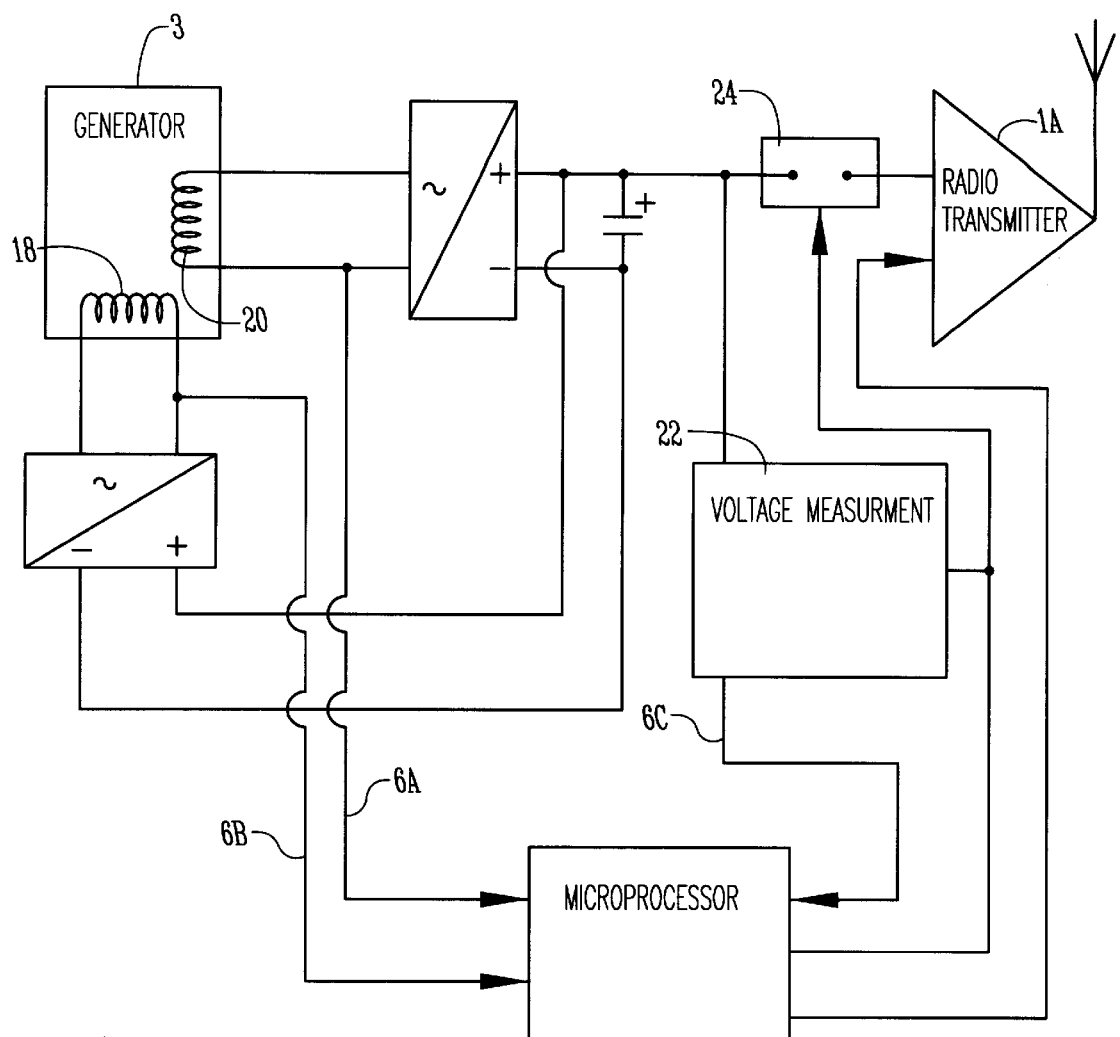
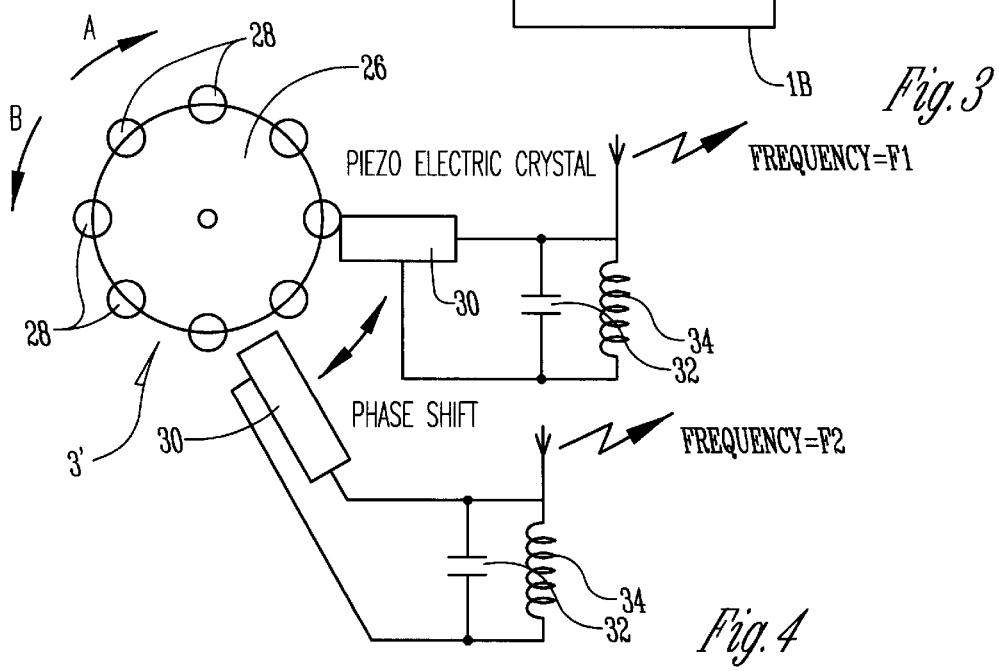
Fig. 3
Fig. 4

METHOD AND APPARATUS FOR WIRELESS REMOTE CONTROL

CROSS-REFERENCE TO A RELATED APPLICATION

This application is a continuation-in-part of commonly assigned application, Teijo Viljanen, Ser. No. 08/345,595, now abandoned, entitled METHOD AND APPARATUS FOR WIRELESS REMOTE CONTROL, filed Nov. 28, 1994, which is based on Finnish application Ser. No. 935419, filed Dec. 3, 1993, whose disclosures are hereby incorporated by reference.

BACKGROUND OF THE INVENTION

Generally known are wireless remote controllers based on infrared or radio waves or ultra sound and intended for televisions, lighting, locks etc. Fixedly mounted wireless controllers are also gaining popularity among light controls. The most difficult problem with these involves batteries which must be replaced every few years and which are also environmentally harmful. In order to eliminate batteries it is conceivable to use a photocell-accumulator assembly, for example. However, this is not functional since, prior to switching on the lights, there is not always light available for recharging the accumulators and, in addition, even accumulators are subject to aging.

SUMMARY OF THE INVENTION

In the present invention, this problem has been solved by fitting a control-signal transmitter with a manually operated minigenerator for producing the necessary electrical energy for transmitting a control signal. The characterizing features of the invention are discussed below and some are set forth in the appended claims.

The invention can be applied for example in the control and/or regulation of lights. When studying the application of the invention, it was observed that the energy required for turning the knob or pressing the button of a normal light regulator is well sufficient for producing a transmission, for example an infrared transmission. Therefore, it is possible to design a wireless remote control transmitter which resembles and feels like a typical minicontroller.

BRIEF DESCRIPTION OF THE DRAWINGS

The invention will now be described in more detail with reference made to the accompanying drawings.

FIG. 3 shows a schematic diagram of one embodiment of a transmitter of the present invention.

FIG. 4 shows schematically a design using a piezo generator.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalences which may be included within the spirit and scope of the invention.

Figure 1:
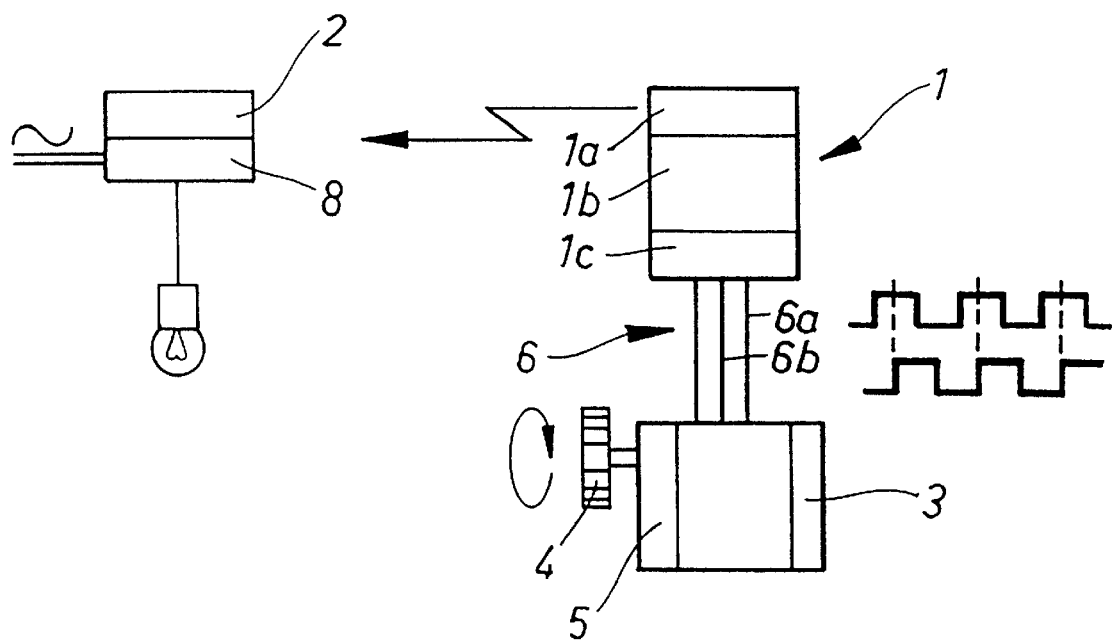
FIG. 1 shows schematically a design according to one embodiment of the present invention.

In the example of FIG. 1, the apparatus includes a generator 3 which can be rotated from an operating knob 4 through the intermediary of a gear set 5. The electric power produced by the generator 3 is delivered by wires 6 to a transmitter 1 which includes a voltage regulator 1c, a microprocessor 1b and transmitter diodes 1a. The microprocessor 1b is used for encoding a control signal to be transmitted with an IR-protocol, for example. Naturally, it is also possible to use a signal transmitted by radio waves or ultrasound. The control signal is received by a conventional remote control receiver 2 associated with a light controller 8.

Figure 7:
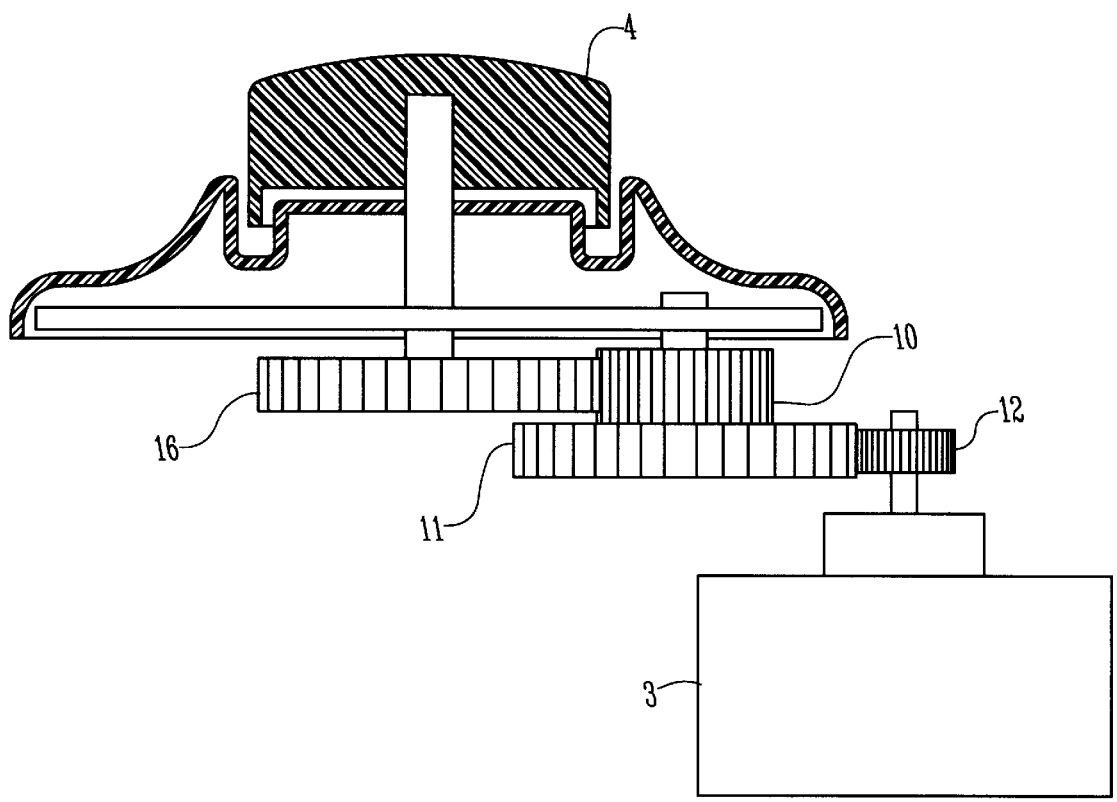
FIG. 7 shows an embodiment with a generator being driven by a dial.

FIG. 7 shows one embodiment of a configuration for rotating the generator 3 by turning the knob 4. As shown in FIG. 7, when the knob is rotated, a first cog 16 is turned causing the small cog wheel 10 to rotate. The intermediate cog wheel 11 is also caused to rotate which in turn rotates the generator shaft cog 12 to actuate the generator 3.

FIG. 3 shows a schematic diagram of one embodiment of the present invention. FIG. 3 shows how two coils 18 and 20 of an inductive generator 3 can be connected to the microprocessor 1b and the remote control radio transmitter 1a. When a voltage measurement circuit 22 detects a sufficient voltage level for the remote control, it closes the power line switch 24 and enables the microprocessor 1b to receive pulses from the generator coils 18 and 20 through lines 6a and 6b. The microprocessor 1b is adapted to analyze the direction of phase shift of the pulses to determine the control direction and the number of pulses to determine the amount of control (discussed below).

The generator 3 may be comprised of a stepping motor provided with two windings. The two windings supply pulses to conductors 6a and 6b which are in phase shift with each other. Thus, the selection of rotating direction of the generator 3 can be used for setting the control direction up or down. The extent and/or speed of rotation of the operating knob 4 can be further used for influencing the rate or degree of a function to be controlled. Thus, in the illustrated example the lights can be switched on and off and, in addition, the level of illumination can be regulated by rotating a single knob.

Figure 5:
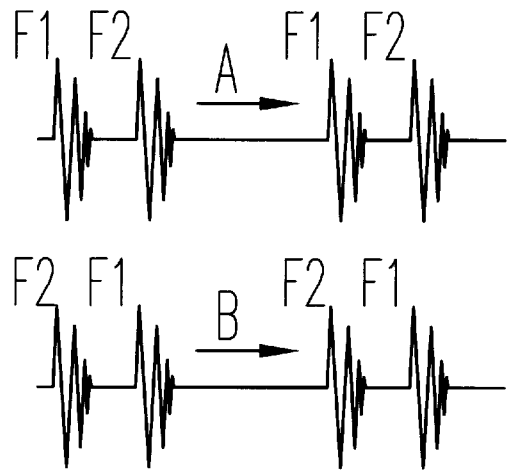
FIG. 5 illustrates two possible signals created by the embodiment shown in FIG. 4.

FIG. 4 shows a piezo generator 3 having a rotatable wheel 26 with hammer pieces 28 divided along its periphery. The rotatable wheel 26 can rotate in either direction A or B as shown by the arrows. Two piezo electric crystals 30 are located close to the wheel 26 such that the hammer pieces 28 hit them at a phase shift. Each crystal 30 is connected to a resonant circuit comprised of a capacitor 32 and a coil 34. The resonant circuits are tuned to oscillate at different frequencies F1 and F2. As a result, the receiver 2 will receive pulse sequences F1F2 or F2F1 as shown in FIG. 5 depending on the direction the wheel 26 is rotated. When the wheel 26 is rotated in direction A, the pulse sequence F1F2 is created. On the other hand, when the wheel 26 is rotated in the direction B, the pulse sequence F2F1 is created. As a result, the control direction A (up) or B (down) can be determined by the receiver 2. Again, the number of pulses F1F2 or F2F1 determines the amount of desired control. So, for example, if this configuration is used with a light dimmer, when the wheel is rotated, the lights will brighten or dim depending on the direction the wheel is turned and the amount the light dims or brightens depends on the number of pulses created.

After the microprocessor 1b analyzes the direction of phase shift of the pulses and the number of pulses, the microprocessor 1b provides a modulation signal to the radio transmitter 1a in order to modulate the radio signal according to any preselected characteristics which can be identified by the remote control receiver 2.

Figure 2:
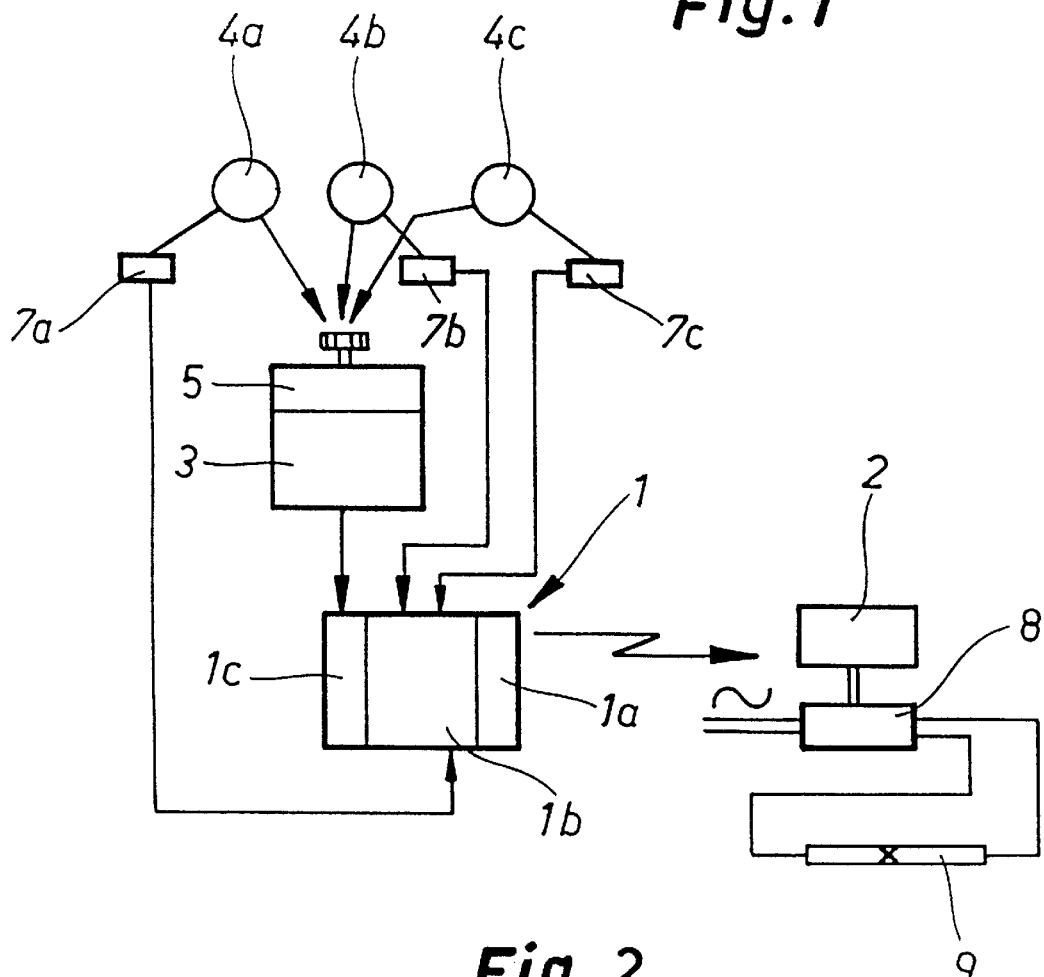
FIG. 2 shows schematically a design according to a second embodiment of the present invention.

The exemplary embodiment of FIG. 2 differs from the above in that the turning knob 4 has been replaced by one or more of press buttons 4a, 4b, and 4c. Upon pressing either of the press button 4a–c, the generator 3 supplies energy to the transmitter 1. In addition, the press buttons 4a–c are provided with micro-switches 7a, 7b, 7c for producing various control commands to a microprocessor 1b. For example, the micro-switch 7a could issue an up-command and the micro-switch 7b could issue a down-command. The micro-switch 7c may reestablish some preset condition for example. The embodiment of receiver 2 shown in FIG. 2 controls a light regulator associated with an electric ballast 8. Hence, a lamp 9 can be switched on and off by means of a remote controller which is also capable of controlling the level of illumination up and down or selecting a predetermined level of illumination. Also, in this case, the different rotating directions of the generator 3 can be used for producing different commands, e.g. up and down, whereby the micro-switches 7a and 7b are not necessary unless further information is required on the basis of the number of pressing times applied to the same knob.

Figure 6:
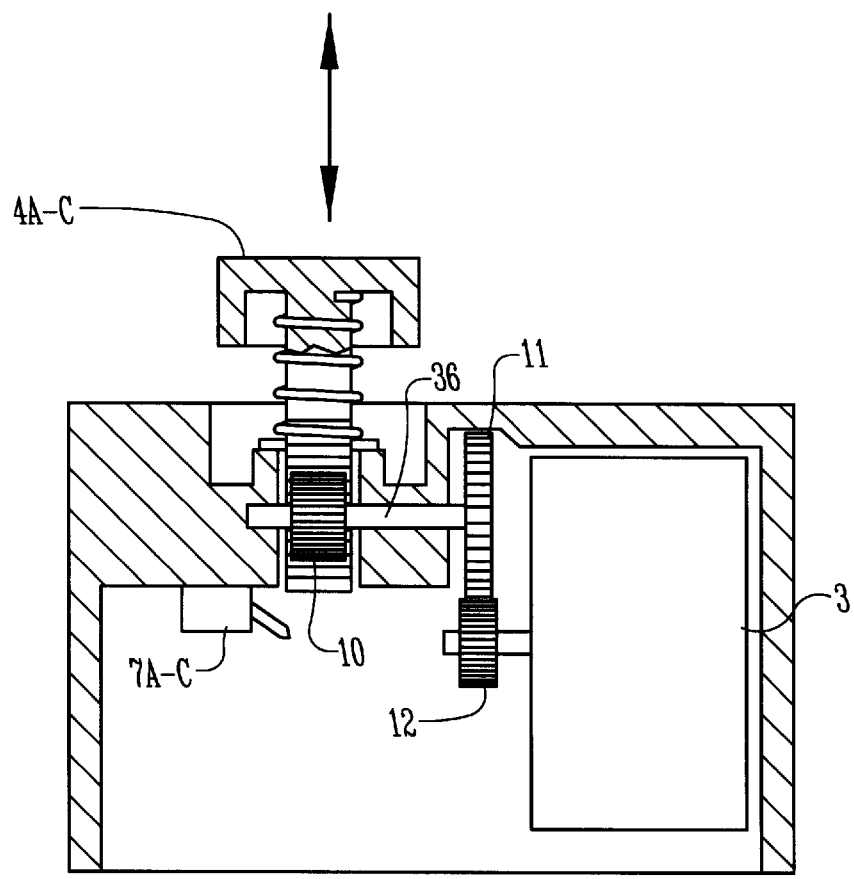
FIG. 6 shows an embodiment with a generator being driven by one or more push buttons.

FIG. 6 shows one example of the embodiment shown in FIG. 2. FIG. 6 shows one of the press buttons 4a–c and one of the micro-switches 7a–c. The push button 4a–c moves along a linear path as shown by the arrow in FIG. 6. Each press button 4a–c causes a small cogwheel 10 to rotate. The small cog wheel 10 is made to freely rotate around its axis 36 in one direction but rotates the axis 36 in the other direction. The axis 36 causes the intermediate cog wheel 11 to rotate which in turn causes the generator shaft cog 12 to rotate. The intermediate cog wheel 11 can be rotated in the same or opposite direction by corresponding cog wheels of additional adjacent push buttons 4a–c (not shown). FIG. 6 also shows a micro switch 7a–c which can be actuated by the press button 4a–c.

The degree of control can be calculated directly from pulses supplied by the generator 3.

In several practical applications it is preferred that the transmitter 1 and generator 3 provide a hand-held control unit.

Naturally, the invention is not limited by the above-exemplary embodiments but the design and operation may vary in many ways within the scope of the appended claims. For example, the inductively operating generator can be replaced by piezoelectrically or triboelectrically operating generator, although in the majority of applications an inductive generator may be the most preferred. The inductive generators used in the preferred embodiment are preferably the Series M82100 Stepper Motor manufactured by Airpax Co. The essential feature in the invention is that a transmitter with no batteries receives its operating power from a generator which produces electrical energy upon turning or pressing an operating element in a physical manner, e.g. manually, by the operator.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A method for wireless hand-held remote control, characterized in that the electric power required by a transmitter (1) supplying a control signal in a wireless manner to a remote controlled apparatus (20) is produced by means of a generator (3) which converts mechanical power into electric power, the generator being provided with an operating element (4) which is operated by the action of physical force from the operator, wherein a desired amount and direction of a control is selectively effected by means of the same operating element (4) as the one used for operating the generator (3), wherein the control signal produced comprises two separate signals, and wherein the direction of control is determined by differences in the two separate signals.

2. A method as set forth in claim 1, characterized in that the electric power is produced by the generator (3) inductively.

3. A method as set forth in claim 1, characterized in that the generator (3) is operated by turning the operating element (4) and the selection of rotating direction issued for selecting various control commands.

4. A method as set forth in claim 1, characterized in that the extent and speed of turning the operating element (4) is used for influencing the rate or degree of a function to be controlled.

5. A method as set forth in claim 2, characterized in that the generator (3) is operated by turning the operating element (4) and the selection of rotating direction is used for selecting various control commands.

6. A method as set forth in claim 2, characterized in that the extent and speed of turning the operating element (4) is used for influencing the rate or degree of a function to be controlled.

7. A method as set forth in claim 3, characterized in that the extent and speed of turning the operating element (4) is used for influencing the rate or degree of a function to be controlled.

8. A method as set forth in claim 1, wherein the two separate signals include a phase shift with respect to each other, wherein the direction of control is determined by which of the two signals is leading.

9. A method as set forth in claim 1, wherein the two separate signals include contain different frequencies in different orders, wherein the direction of control is determined by the order of the different frequencies.

10. An apparatus for a hand-held wireless remote control, characterized in that the power source for a control signal transmitter (1) comprises a generator (3) which produces electric energy upon actuating an operating element (4), wherein a desired amount and direction of a control function is selectively effected by the actuation of the same operating element (4) as the one used for operating the generator (3), wherein the control signal comprises two separate signals, and wherein the direction of control is determined by the relationship between the two separate signals.

11. An apparatus as set forth in claim 10, characterized in that the manually operated generator (3) produces electric energy inductively.

12. An apparatus as set forth in claim 11, characterized in that the generator (3) comprises a stepping motor provided with two windings and rotatable in first and second directions, wherein said control signal transmitter transmits a first signal when said motor is rotated in the first direction and transmits a second signal when said motor is rotated in the second direction.

13. An apparatus as set forth in claim 10, characterized in that there is a gear (5) between the generator (3) and the operating element (4).

14. An apparatus as set forth in claim 10, characterized in that the operating element for the generator (3) comprises a turning knob.

15. An apparatus as set forth in claim 10 further comprising a plurality of press buttons associated with the operating element for actuating the operating element.

16. A wireless remote control for remotely controlling a device, the remote control comprising:

an electrical generator for converting mechanical power into electrical power;

an operating element operatively coupled to the electrical generator such that mechanical power used to actuate the operating element is converted to electrical power by the electrical generator and is used to power the wireless remote control, wherein the generator produces a control signal have two separate components, wherein an amount and direction of a desired control function is selectively effected by the operating element, depending on the two separate components of the control signal.

17. A method for wireless hand-held remote control, characterized in that the electric power required by a transmitter (1) supplying a control signal in a wireless manner to a remote controlled apparatus (20) is produced by means of a generator (3) which converts mechanical power into electric power, the generator being provided with an operating element (4) which is operated by the action of physical force from the operator, wherein a desired amount and direction of a control is selectively effected by means of the same operating element (4) as the one used for operating the generator (3), wherein a plurality of press buttons are associated with the operating element, and wherein the generator (3) is operated by pressing one of said press buttons to actuate the operating element and the selection from the plurality of press buttons is used for selecting various control commands.

18. A method as set forth in claim 17, characterized in that various control commands are produced by means of micro-switches (7a, 7b, 7c) associated with said plurality of press buttons.

19. An apparatus for a hand-held wireless remote control, characterized in that the power source for a control signal transmitter (1) comprises a generator (3) which produces electric energy upon actuating an operating element (4), a plurality of press buttons associated with the operating element for actuating the operating element, wherein a desired amount and direction of a control function is selectively effected by the actuation of the same operating element (4) as the one used for operating the generator (3).

20. An apparatus for a hand-held wireless remote control, characterized in that the power source for a control signal transmitter (1) comprises a generator (3) which produces electric energy upon actuating an operating element (4), wherein a desired amount and direction of a control function is selectively effected by the actuation of the same operating element (4) as the one used for operating the generator (3), wherein the operating element for the generator (3) further comprises a plurality of press buttons (4a, 4b, 4c) which are provided with micro-switches (7a, 7b, 7c) for producing various control commands.

* * * * *